United States Patent
Takahashi et al.

[11] 3,976,367
[45] Aug. 24, 1976

[54] RETROFOCUS TYPE WIDE ANGLE LENS OF LOW F-NUMBER

[75] Inventors: Yasuo Takahashi, Tokyo; Sadao Okudaira, Saitama, both of Japan

[73] Assignee: Asahi Kogaku Kogyo Kabushiki Kaisha, Tokyo, Japan

[22] Filed: Feb. 3, 1975

[21] Appl. No.: 546,483

[30] Foreign Application Priority Data
Feb. 1, 1974 Japan............................. 49-13455

[52] U.S. Cl. ................................................ 350/214
[51] Int. Cl.² .......................................... G02B 9/00
[58] Field of Search ..................................... 350/214

[56] References Cited
UNITED STATES PATENTS

| | | | |
|---|---|---|---|
| 3,738,738 | 6/1973 | Takahashi | 350/214 |
| 3,841,736 | 10/1974 | Takahashi et al. | 350/214 |
| 3,870,402 | 3/1975 | Takahashi et al. | 350/214 |

*Primary Examiner*—John K. Corbin
*Assistant Examiner*—Conrad Clark
*Attorney, Agent, or Firm*—Sughrue, Rothwell, Mion, Zinn & Macpeak

[57] ABSTRACT

A wide angle lens of high performance comprising twelve lenses grouped in ten components which satisfies the following four conditions:

$$F/1.8 < |F_{1,2,3,4}| < F/1.1, \quad F_{1,2,3,4} < 0 \quad (1)$$
$$F/0.6 < |F_{1,2,3,4,5,6}| < F/0.15, \quad F_{1,2,3,4,5,6} < 0 \quad (2i)$$
$$F/1.4 < F_{1,2,3,4,5,6,7} < F/0.8 \quad (2ii)$$
$$0.1 < n_x - n_y < 0.2 \quad (3)$$
$$0.3_f < (d_1 + d_2 + d_3 + d_4 + d_5) < 0.5_f \quad (4)$$

2 Claims, 10 Drawing Figures

RETROFOCUS TYPE WIDE ANGLE LENS OF LOW F-NUMBER

SUMMARY OF THE INVENTION

In the development in the retrofocus type lens, a wide angle lens of small F-number has been developed. This invention relates to a lens of this type, and more specifically to a lens having the angle of field of about 95° and the F-number of about 2.8. This is accomplished by providing a wide angle lens of high performance comprising twelve lenses grouped in ten components which satisfies the following four conditions:

$$F/1.8 < |F_{1.2.3.4}| < F/1.1, \quad F_{1.2.3.4} < 0 \tag{1}$$

$$F/0.6 < |F_{1.2.3.4.5.6}| < F/0.15, \quad F_{1.2.3.4.5.6} < 0 \tag{2i}$$

$$F/1.4 < F_{1.2.3.4.5.6.7} < F/0.8 \tag{2ii}$$

$$0.1 < n_8 - n_9 < 0.2 \tag{3}$$

$$0.31 < (d_1 + d_2 + d_3 + d_4 + d_5) < 0.5\, l \tag{4}$$

BRIEF DESCRIPTION OF THE DRAWINGS

The specific nature of the invention, as well as other objects, aspects, uses and advantages thereof, will clearly appear from the following description and from the accompanying drawings, in which.

DESCRIPTION OF THE PREFERRED EMBODIMENTS

Figure 1:
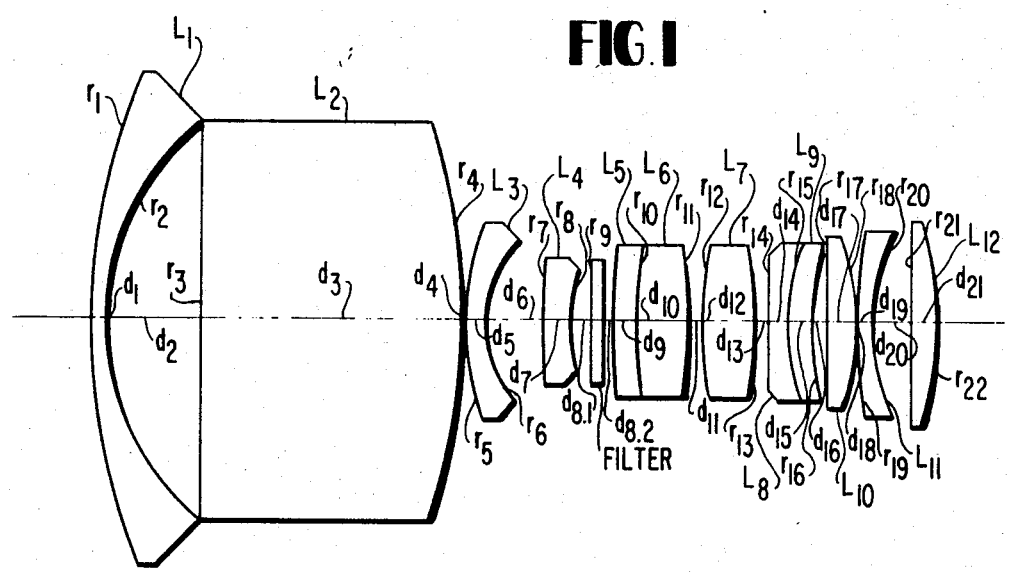
FIG. 1 is a view showing the lens system in accordance with the first embodiment of the invention including a filter.

Describing the construction of the lens first, the first lens is a negative lens, the second lens is a positive lens, the third and the fourth lenses are negative meniscus lenses concave to the image side, the fifth and the sixth lenses constitute a cemented lens, and a filter is located between the fourth lens and the fifth lens. The seventh lens is a positive lens, the eighth lens is a negative lens, and the nineth lens is a positive lens which is cemented with the eighth lens. The tenth lens is a positive lens, the eleventh lens is a negative meniscus lens, and the twelfth lens is a positive lens.

The features of the lens in accordance with the present invention are as follows:

$$F/1.8 < |F_{1.2.3.4}| < F/1.1, \quad F_{1.2.3.4} < 0 \tag{1}$$

$$F/0.6 < |F_{1.2.3.4.5.6}| < F/0.15, \quad F_{1.2.3.4.5.6} < 0 \tag{2i}$$

$$F/1.4 < F_{1.2.3.4.5.6.7} < F/0.8 \tag{2ii}$$

$$0.1 < n_8 - n_9 < 0.2 \tag{3}$$

$$0.31 < (d_1 + d_2 + d_3 + d_4 + d_5) < 0.51 \tag{4}$$

wherein the characters designate dimensions as follows:

F: composite focal length
$F_{1.2......i}$: composite focal length of the lens system consisting of the first to the i-th lenses
$d_j$: the j-th spacing or lens thickness
$r_k$: radius of curvature of the k-th surface
$n_i$: refractive index for d-line of the i-th lens
$v_i$: Abbe's number of the i-th lens
$l$: total length of the lens
$f_B$: back focal length.

Now the features of the lens of this invention as described above will be described in detail.

The first feature (1) defines a front negative lens system consisting of the front four lenses which refracts the light incident thereto at a wide angle to make it incident to the fifth lens at a comparatively small angle. This is to be defined with reference to the range of F-number of the lens. When the focal length $|F_{1.2.3.4}|$ is short over F/1.8, the load on the fifth lens and the lenses therebehind is reduced. However, when aperture efficiency is in the range of practically useful levels within the range of F-number not less than 2.8, the coma aberration is possibly deteriorated. When, to the contrary, the focal length of the lens system consisting of the four lenses is longer than that corresponding to F/1.1, the load on the fifth lens and the lenses therebehind become severe with respect to the long back focus and the wide angle of field, which is disadvantageous from the viewpoint of the whole system.

The second features (2)(i) and (ii) define the power of the seventh lens to compensate for a chromatic aberration of the lens system consisting of the first lens to the seventh lens which is determined with reference to the characteristic of the glass material of the fifth, sixth and seventh lenses. Further, these features are important for making a balance of aberration in the lens system consisting of the front seven lenses. When $|F_{1.2.3.4.5.6}|$ is shorter than the focal length corresponding to F/0.6, requirements for the seventh lens become severe when the focal length $F_{1.2.3.4.5.6.7}$ is shorter than the focal length corresponding to the F/1.4. The severe requirements make the manufacture of the lenses difficult. Further, owing to the extreme compensation, the aberration of unnatural form which is very difficult to be compensated for appears. When the focal length $|F_{1.2.3.4.5.6}|$ is shorter than that corresponding to F/0.6, a long back focus can be comparatively easily obtained, but the lenses behind the seventh lens are required to have higher positiveness. To the contrary, when the focal length is longer than that corresponding to F/0.15, a long back focal length cannot be obtained easily. In addition, in this case, the positiveness of the seventh lens is small and the compensation for the coma for the light of comparatively small incident angle becomes difficult in combination with the eighth and ninth lenses. When the focal length $F_{1.2.3.4.5.6.7}$ is shorter than that corresponding to F/1.4, the compensation by the eighth and ninth lenses become extremely large, which is undesirable from the viewpoint of compensation of aberration. When the focal length is longer than that corresponding to F/0.8, the compensation becomes insufficient, and Petzval sum increases.

The third feature (3) defines a difference in the refractive index for compensating the spherical aberration and properly compensating the coma aberration. This feature is important for properly compensating the coma of chromatic aberration and balance the chromatic aberration of the whole lens system in connection with the value $\nu$ and the radius of curvature.

The fourth feature (4) defines the relation between the aberrations and the length of the lens system. That is, when the length of the lens system is smaller than 0.3 l, the purpose for making the lens system short is satisfied with reference to the first feature and the second feature (2) i), but the aberration is deteriorated. When the length of the lens system is longer than 0.5 l, the aberration is improved but the overall length of the lens system becomes too long. If the rear lens component is made small to solve this problem, the balance in aberrations is deteriorated.

Two specific examples of the present invention will be described hereinbelow.

The first example is shown in FIG. 1 and consists of a negative meniscus lens $L_1$, a thick double convex lens $L_2$, a negative meniscus lens $L_3$, a negative meniscus lens $L_4$, a first cemented doublet consisting of a negative meniscus lens $L_5$ and a double convex lens $L_6$, a double convex lens $L_7$, a second cemented doublet consisting of a plano-concave lens $L_8$ and a positive meniscus lens $L_9$, a double convex lens $L_{10}$, a negative meniscus lens $L_{11}$, and a plano-convex lens $L_{12}$. A filter is inserted between lenses $L_4$ and $L_5$. The radii $r_1$ to $r_{22}$ and the thickness and separations $d_1$ to $d_{21}$, along with refractive indices $n_1$ to $n_{12}$ and Abbe numbers $\nu_1$ to $\nu_{12}$ for lenses $L_1$ to $L_{12}$ are given in Table I as follows:

TABLE I $F = 100$
$F_{1,2,3,4} = -70.42$
$F_{1,2,3,4,5,6} = -274.72$
$F_{1,2,3,4,5,6,7} = 108.22$
$f_B = 178.14$

| Lens | Radius of Curvature r | Lens Thickness or Distance d | Refractive index n | Abbe No. $\nu$ |
|---|---|---|---|---|
| $L_1$ | $r_1 = 324.0$ | $d_1 = 5.82$ | $n_1 = 1.6400$ | $\nu_1 = 60.2$ |
|  | $r_2 = 126.0$ | $d_2 = 54.94$ |  |  |
| $L_2$ | $r_3 = 3321.8$ | $d_3 = 139.21$ | $n_2 = 1.6204$ | $\nu_2 = 60.3$ |
|  | $r_4 = -350.9$ | $d_4 = 0.48$ |  |  |
| $L_3$ | $r_5 = 119.7$ | $d_5 = 10.19$ | $n_3 = 1.5119$ | $\nu_3 = 58.1$ |
|  | $r_6 = 58.5$ | $d_6 = 28.29$ |  |  |
| $L_4$ | $r_7 = 189.8$ | $d_7 = 14.56$ | $n_4 = 1.8160$ | $\nu_4 = 46.8$ |
|  | $r_8 = 86.5$ | $d_{N-1} = 12.13$ |  |  |
| filter |  | filter thickness = 3.88 |  |  |
|  |  | $d_{N-2} = 4.85$ |  |  |
| $L_5$ | $r_9 = 487.4$ | $d_9 = 11.26$ | $n_5 = 1.8074$ | $\nu_5 = 35.4$ |
| $L_6$ | $r_{10} = 216.3$ | $d_{10} = 28.73$ | $n_6 = 1.7407$ | $\nu_6 = 27.8$ |
|  | $r_{11} = -189.7$ | $d_{11} = 7.76$ |  |  |
| $L_7$ | $r_{12} = 159.7$ | $d_{12} = 26.74$ | $n_7 = 1.5892$ | $\nu_7 = 41.1$ |
|  | $r_{13} = -236.3$ | $d_{13} = 5.67$ |  |  |
| $L_8$ | $r_{14} = \infty$ | $d_{14} = 11.40$ | $n_8 = 1.8051$ | $\nu_8 = 25.4$ |
| $L_9$ | $r_{15} = 95.5$ | $d_{15} = 10.63$ | $n_9 = 1.6393$ | $\nu_9 = 44.9$ |
|  | $r_{16} = 202.0$ | $d_{16} = 7.18$ |  |  |
| $L_{10}$ | $r_{17} = 4078.3$ | $d_{17} = 15.48$ | $n_{10} = 1.6170$ | $\nu_{10} = 62.8$ |
|  | $r_{18} = 110.2$ | $d_{18} = 0.97$ |  |  |
| $L_{11}$ | $r_{19} = 324.2$ | $d_{19} = 7.28$ | $n_{11} = 1.8051$ | $\nu_{11} = 25.4$ |
|  | $r_{20} = 108.8$ | $d_{20} = 14.27$ |  |  |
| $L_{12}$ | $r_{21} = \infty$ | $d_{21} = 14.02$ | $n_{12} = 1.7865$ | $\nu_{12} = 50.2$ |
|  | $r_{22} = -169.6$ |  |  |  |

Figure 2A:
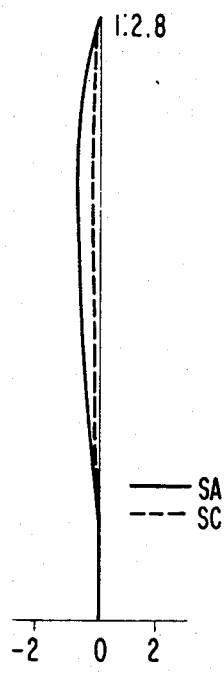
FIGS. 2a to 2d show aberration curves obtained by the lens system in accordance with the first embodiment of the invention.
Figure 2B:
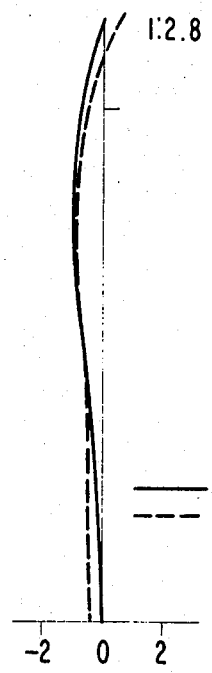
Figure 2C:
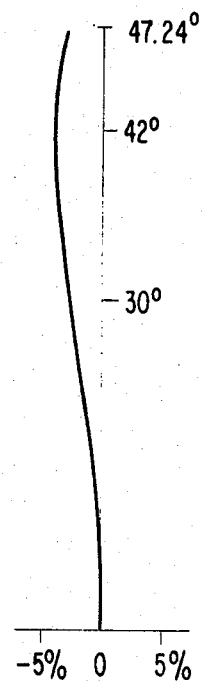
Figure 2D:
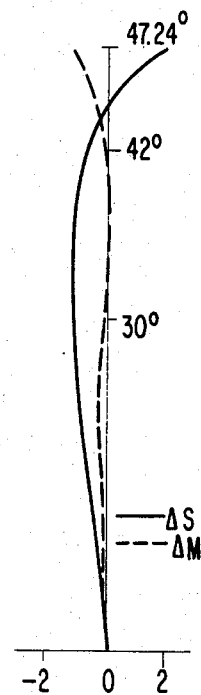

FIG. 2a shows the spherical aberration; FIG. 2b shows the chromatic aberration; FIG. 2c shows the distortion; and FIG. 2d shows the astigmatism of the lens system shown in FIG. 1 and defined in Table I.

Figure 3:
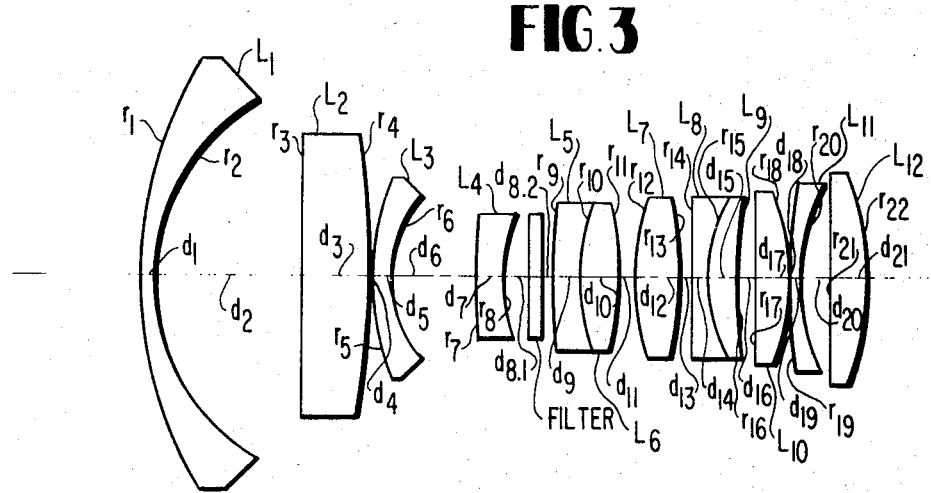
FIG. 3 is a view showing the lens system in accordance with the second embodiment of the invention including a filter.

The second example is shown in FIG. 3 and consists of a negative meniscus lens $L_1$, a double convex lens $L_2$, a negative meniscus lens $L_3$, a negative meniscus lens $L_4$, a first cemented doublet consisting of a negative meniscus lens $L_5$ and a double convex lens $L_6$, a double convex lens $L_7$, a second cemented doublet consisting of a negative meniscus lens $L_8$ and a positive meniscus lens $L_9$, a positive meniscus lens $L_{10}$, a negative meniscus lens $L_{11}$, and a double convex lens $L_{12}$. A filter is inserted between lenses $L_4$ and $L_5$. The radii $r_1$ to $R_{12}$ and Abbe numbers $\nu_1$ to $\nu_{12}$ for lenses $L_1$ to $L_{12}$ are given in Table II as follows:

TABLE II $F = 100$
$F_{1,2,3,4} = -62.89$
$F_{1,2,3,4,5,6} = -239.80$
$F_{1,2,3,4,5,6,7} = 90.74$
$f_B = 183.95$

| Lens | Radius of Curvature r | Lens Thickness or Distance d | Refractive Index n | Abbe No. $\nu$ |
|---|---|---|---|---|
| $L_1$ | $r_1 = 219.2$ | $d_1 = 5.84$ | $n_1 = 1.6968$ | $\nu_1 = 55.7$ |
|  | $r_2 = 110.9$ | $d_2 = 78.58$ |  |  |
| $L_2$ | $r_3 = 2434.5$ | $d_3 = 39.00$ | $n_2 = 1.5955$ | $\nu_2 = 39.2$ |
|  | $r_4 = -369.4$ | $d_4 = 0.53$ |  |  |
| $L_3$ | $r_5 = 132.9$ | $d_5 = 8.91$ | $n_3 = 1.6237$ | $\nu_3 = 46.9$ |
|  | $r_6 = 59.3$ | $d_6 = 37.58$ |  |  |
| $L_4$ | $r_7 = 185.1$ | $d_7 = 14.60$ | $n_4 = 1.8061$ | $\nu_4 = 40.8$ |
|  | $r_8 = 85.4$ | $d_{N-1} = 12.17$ |  |  |
| filter |  | filter thickness = 3.89 |  |  |
|  |  | $d_{N-2} = 4.86$ |  |  |
| $L_5$ | $r_9 = 420.8$ | $d_9 = 11.44$ | $n_5 = 1.8340$ | $\nu_5 = 37.2$ |
| $L_6$ | $r_{10} = 92.6$ | $d_{10} = 20.88$ | $n_6 = 1.7552$ | $\nu_6 = 27.5$ |
|  | $r_{11} = -165.7$ | $d_{11} = 7.30$ |  |  |
| $L_7$ | $r_{12} = 134.7$ | $d_{12} = 24.34$ | $n_7 = 1.5892$ | $\nu_7 = 41.1$ |
|  | $r_{13} = -211.6$ | $d_{13} = 1.85$ |  |  |
| $L_8$ | $r_{14} = 35056.8$ | $d_{14} = 8.42$ | $n_8 = 1.8051$ | $\nu_8 = 25.4$ |
| $L_9$ | $r_{15} = 77.4$ | $d_{15} = 13.13$ | $n_9 = 1.6700$ | $\nu_9 = 47.3$ |
|  | $r_{16} = 169.7$ | $d_{16} = 9.73$ |  |  |
| $L_{10}$ | $r_{17} = -3408.3$ | $d_{17} = 17.72$ | $n_{10} = 1.6134$ | $\nu_{10} = 57.4$ |
|  | $r_{18} = -105.6$ | $d_{18} = 0.43$ | $n_{11} = 1.8466$ | $\nu_{11} = 23.9$ |
| $L_{11}$ | $r_{19} = 299.0$ | $d_{19} = 5.89$ |  |  |
|  | $r_{20} = 106.5$ | $d_{20} = 14.60$ | $n_{12} = 1.5891$ | $\nu_{12} = 61.1$ |
| $L_{12}$ | $r_{21} = 841.8$ | $d_{21} = 18.45$ |  |  |
|  | $r_{22} = -147.5$ |  |  |  |

Figure 4A:
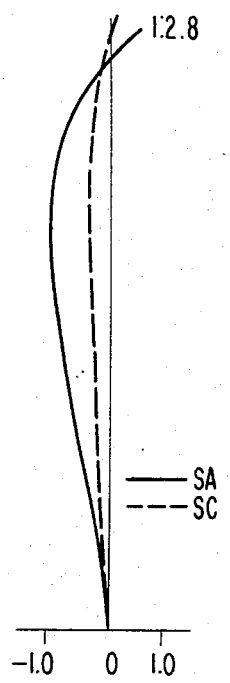
FIGS. 4a to 4d show aberration curves obtained by the lens system in accordance with the second embodiment of the invention.
Figure 4B:
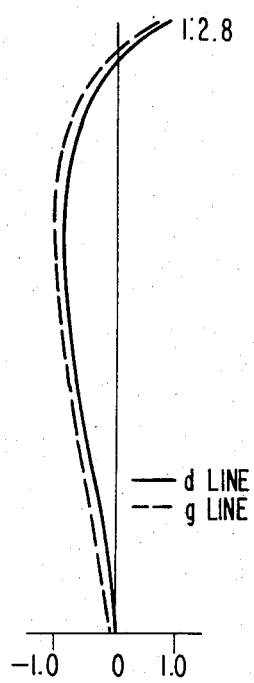
Figure 4C:
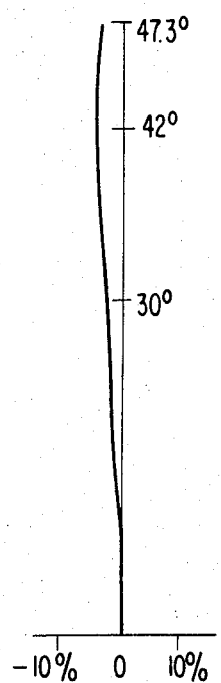
Figure 4D:
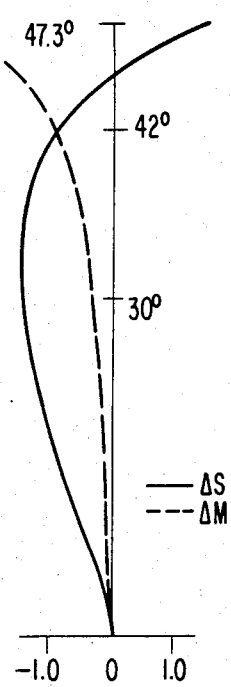

FIG. 4a shows the spherical aberration; FIG. 4b shows the chromatic aberration; FIG. 4c shows the distortion; and FIG. 4d shows the astigmatism of the lens system shown in FIG. 3 and defined in Table II.

It will be apparent that the embodiments shown are only exemplary and that various modifications can be made in construction and arrangement within the scope of the invention as defined in the appended claims.

What is claimed is:

1. A wide angle lens comprising twelve lenses grouped in ten components which satisfies the following conditions:

$$F/1.8 < |F_{1.2.3.4}| < F/1.1, F_{1.2.3.4} < 0 \qquad (1)$$

$$F/0.6 < |F_{1.2.3.4.5.6}| < F/0.15, F_{1.2.3.4.5.6} < 0 \qquad (2i)$$

$$F/1.4 < F_{1.2.3.4.5.6.7} < F/0.8 \qquad (2ii)$$

$$0.1 < n_8 - n_9 < 0.2 \qquad (3)$$

$$0.31 < (d_1 + d_2 + d_3 + d_4 + d_5) < 0.51 \qquad (4)$$

wherein the characters designate dimensions as follows:

F: composite focal length
$F_{1.2......i}$: composite focal length of the lens system consisting of the first to the $i$-th lenses
$d_j$: the $j$-th spacing or lens thickness
$n_i$: refractive index for $d$-line of the $i$-th lens
l: total length of the lens the first lens is a negative meniscus lens, the second lens is a thick double convex lens, the third and fourth lenses are negative meniscus lenses concave to the image side, the fifth and sixth lenses constitute a cemented doublet with the fifth lens being a negative meniscus lens and the sixth lens being a double convex lens, the seventh lens is a double convex lens, the eighth lens is a plano-concave lens, the ninth lens is a positive meniscus lens cemented with said eighth lens, the tenth lens is a double convex lens, the eleventh lens is a negative meniscus lens, and the twelfth lens is a plano-convex lens, and further comprising a filter located between said fourth lens and said fifth lens wherein the radii $r_1$ to $r_{22}$, the thicknesses and separations $d_1$ to $d_{21}$, the refractive indices $n_1$ to $n_{12}$, and Abbe numbers $\nu_1$ to $\nu_{12}$ of said first to twelfth lenses $L_1$ to $L_{12}$, respectively, satisfy the following conditions:

F = 100
$F_{1.2.3.4} = -70.42$
$F_{1.2.3.4.5.6} = -274.72$
$F_{1.2.3.4.5.6.7} = 108.22$
(back focal length)
$f_B = 178.14$

| Lens | Radius of Curvature r | Lens Thickness or Distance d | Refractive index n | Abbe No. $\nu$ |
|---|---|---|---|---|
| $L_1$ | $r_1 = 324.0$ | $d_1 = 5.82$ | $n_1 = 1.6400$ | $\nu_1 = 60.2$ |
|  | $r_2 = 126.0$ | $d_2 = 54.94$ |  |  |
| $L_2$ | $r_3 = 3321.8$ | $d_3 = 139.21$ | $n_2 = 161$ 1.6204 | $\nu_2 = 60.3$ |
|  | $r_4 = -350.9$ | $d_4 = 0.48$ |  |  |
| $L_3$ | $r_5 = 119.7$ | $d_5 = 10.19$ | $n_3 = 1.5119$ | $\nu_3 = 58.1$ |
|  | $r_6 = 58.5$ | $d_6 = 28.29$ |  |  |
| $L_4$ | $r_7 = 189.8$ | $d_7 = 14.56$ | $n_4 = 1.8160$ | $\nu_4 = 46.8$ |
|  | $r_8 = 86.5$ | $d_{8-1} = 12.13$ |  |  |
|  | filter | filter thickness = 3.88 $d_{8-2} = 4.85$ |  |  |
| $L_5$ | $r_9 = 487.4$ | $d_9 = 11.26$ | $n_5 = 1.8074$ | $\nu_5 = 35.4$ |
| $L_6$ | $r_{10} = 216.3$ | $d_{10} = 28.73$ | $n_6 = 1.7407$ | $\nu_6 = 27.8$ |
|  | $r_{11} = -189.7$ | $d_{11} = 7.76$ |  |  |
| $L_7$ | $r_{12} = 159.7$ | $d_{12} = 26.74$ | $n_7 = 1.5892$ | $\nu_7 = 41.1$ |
|  | $r_{13} = -236.3$ | $d_{13} = 5.67$ |  |  |
| $L_8$ | $r_{14} = \infty$ | $d_{14} = 11.40$ | $n_8 = 1.8051$ | $\nu_8 = 25.4$ |
| $L_9$ | $r_{15} = 95.5$ | $d_{15} = 10.63$ | $n_9 = 1.6393$ | $\nu_9 = 44.9$ |
|  | $r_{16} = 202.0$ | $d_{16} = 7.18$ |  |  |
| $L_{10}$ | $r_{17} = 4078.3$ | $d_{17} = 15.48$ | $n_{10} = 1.6170$ | $\nu_{10} = 62.8$ |
|  | $r_{18} = 110.2$ | $d_{18} = 0.97$ |  |  |
| $L_{11}$ | $r_{19} = 324.2$ | $d_{19} = 7.28$ | $n_{11} = 1.8051$ | $\nu_{11} = 25.4$ |
|  | $r_{20} = 108.8$ | $d_{20} = 14.27$ |  |  |
| $L_{12}$ | $r_{21} = \infty$ | $d_{21} = 14.02$ | $n_{12} = 1.7865$ | $\nu_{12} = 50.2$ |
|  | $r_{22} = -169.6$ |  |  |  |

2. A wide angle lens comprising twelve lenses grouped in ten components which satisfies the following conditions:

$$F/1.8 < |F_{1.2.3.4}| < F/1.1, F_{1.2.3.4} < 0 \qquad (1)$$

$$F/0.6 < |F_{1.2.3.4.5.6}| < F/0.15, F_{1.2.3.4.5.6} < 0 \qquad (2i)$$

$$F/1.4 < F_{1.2.3.4.5.6.7} < F/0.8 \qquad (2ii)$$

$$0.1 < n_8 - n_9 < 0.2 \qquad (3)$$

$$0.31 < (d_1 + d_2 + d_3 + d_4 + d_5) < 0.51 \qquad (4)$$

wherein the characters designate dimensions as follows:

F: composite focal length
$F_{1.2......i}$: composite focal length of the lens system consisting of the first to the $i$-th lenses
$d_j$: the $j$-th spacing or lens thickness
$n_i$: refractive index for $d$-line of the $i$-th lens
l: total length of the lens the first lens is a negative meniscus lens, the second lens is a double convex lens, the third and fourth lenses are negative meniscus lenses concave to the image side, the fifth and sixth lenses constitute a cemented doublet with the fifth lens being a negative meniscus lens and the sixth lens being a double convex lens, the seventh lens is a double convex lens, the eighth lens is a negative meniscus lens, the ninth lens is a positive meniscus lens cemented with said eighth lens, the tenth lens is a positive meniscus a lens, the eleventh lens is a negative meniscus lens, and the twelfth lens is a double convex lens, and further comprising a filter located between said fourth lens and said fifth lens wherein the radii $r_1$ to $r_{22}$, the thicknesses and separations $d_1$ to $d_{21}$, the refractive indices $n_1$ to $n_{12}$, and Abbe numbers $\nu_1$ to $\nu_{12}$ of said first to twelfth lenses $L_1$ to $L_{12}$, respectively, satisfy the following conditions:

F = 100
$F_{1.2.3.4} = -62.89$
$F_{1.2.3.4.5.6} = -239.80$
$F_{1.2.3.4.5.6.7} = 90.74$
(back focal length)
$f_B = 183.95$ -continued

| Lens | Radius of Curvature r | Lens Thickness or Distance d | Refractive Index n | Abbe No. $\nu$ |
|---|---|---|---|---|
| $L_1$ | $r_1 = 219.2$ | $d_1 = 5.84$ | $n_1 = 1.698$ | $\nu_1 = 55.7$ |
| | $r_2 = 110.9$ | $d_2 = 78.58$ | | |
| $L_2$ | $r_3 = 2434.5$ | $d_3 = 39.00$ | $n_2 = 5955$ | $\nu_2 = 39.2$ |
| | $r_4 = -369.4$ | $d_4 = 0.53$ | | |
| $L_3$ | $r_5 = 132.9$ | $d_5 = 8.91$ | $n_3 = 1.6237$ | $\nu_3 = 46.9$ |
| | $r_6 = 59.3$ | $d_6 = 37.58$ | | |
| $L_4$ | $r_7 = 185.1$ | $d_7 = 14.60$ | $n_4 = 1.8061$ | $\nu_4 = 40.8$ |
| | $r_8 = 85.4$ | | | |
| filter | | $d_{x-1} = 12.17$ filter thickness = 3.89 $d_{x\,2} = 4.86$ | | |
| $L_5$ | $r_9 = 420.8$ | $d_9 = 11.44$ | $n_5 = 1.8340$ | $\nu_5 = 37.2$ |
| | $r_{10} = 92.6$ | | | |

-continued

| | | | | |
|---|---|---|---|---|
| $L_6$ | $r_{11} = -165.7$ | $d_{10} = 20.88$ | $n_6 = 1.7552$ | $\nu_6 = 27.5$ |
| | $r_{12} = 134.7$ | $d_{11} = 7.30$ | | |
| $L_7$ | $r_{13} = -211.6$ | $d_{12} = 24.34$ | $n_7 = 1.5892$ | $\nu_7 = 41.1$ |
| | $r_{14} = 35056.8$ | $d_{13} = 1.85$ | | |
| $L_8$ | $r_{15} = 77.4$ | $d_{14} = 8.42$ | $n_8 = 1.8051$ | $\nu_8 = 25.4$ |
| $L_9$ | $r_{16} = 169.7$ | $d_{15} = 13.13$ | $n_9 = 1.6700$ | $\nu_9 = 47.3$ |
| $L_{10}$ | $r_{17} = -3408.3$ | $d_{16} = 9.73$ | | |
| | $r_{18} = -105.6$ | $d_{17} = 17.72$ | $n_{10} = 1.6134$ | $\nu_{10} = 57.4$ |
| $L_{11}$ | $r_{19} = 299.0$ | $d_{18} = 0.43$ | $n_{11} = 1.8466$ | $\nu_{11} = 23.9$ |
| | $r_{20} = 106.5$ | $d_{19} = 5.89$ | | |
| $L_{12}$ | $r_{21} = 841.8$ | $d_{20} = 14.60$ | $n_{12} = 1.5891$ | $\nu_{12} = 61.1$ |
| | $r_{22} = -147.5$ | $d_{21} = 18.45$ | | |

* * * * *